US009940565B2

(12) United States Patent
Kimura et al.

(10) Patent No.: US 9,940,565 B2
(45) Date of Patent: Apr. 10, 2018

(54) TWO-DIMENSIONAL CODE GENERATION DEVICE AND TWO-DIMENSIONAL CODE GENERATION PROGRAM PRODUCT

(71) Applicant: DENSO CORPORATION, Kariya, Aichi-pref. (JP)

(72) Inventors: Yousuke Kimura, Kariya (JP); Masatoshi Itoh, Kariya (JP); Hiroki Ukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/125,225

(22) PCT Filed: Mar. 9, 2015

(86) PCT No.: PCT/JP2015/001274
§ 371 (c)(1),
(2) Date: Sep. 12, 2016

(87) PCT Pub. No.: WO2015/146021
PCT Pub. Date: Oct. 1, 2015

(65) Prior Publication Data
US 2017/0116504 A1 Apr. 27, 2017

(30) Foreign Application Priority Data
Mar. 24, 2014 (JP) ................. 2014-060073

(51) Int. Cl.
*G06K 9/36* (2006.01)
*G06K 19/06* (2006.01)
*G06F 17/30* (2006.01)

(52) U.S. Cl.
CPC . *G06K 19/06037* (2013.01); *G06F 17/30241* (2013.01); *G06K 19/06103* (2013.01)

(58) Field of Classification Search
CPC ................. G06K 19/06037; G06K 7/1417
USPC .................... 235/461.1, 462.09, 462.1
See application file for complete search history.

(56) References Cited

U.S. PATENT DOCUMENTS

| 8,985,437 B2 * | 3/2015 | Burkhart .......... G06K 19/06037 235/375 |
| 8,991,688 B1 * | 3/2015 | Daboub ............ G06F 17/30879 235/375 |
| 9,016,571 B2 * | 4/2015 | Lee .................. G06K 19/06037 235/437 |

FOREIGN PATENT DOCUMENTS

| JP | 2003288558 A | 10/2003 |
| JP | 2005341369 A | 12/2005 |
| JP | 2009230729 A | 10/2009 |

* cited by examiner

*Primary Examiner* — Daniel St Cyr
(74) *Attorney, Agent, or Firm* — Harness, Dickey & Pierce, P.L.C.

(57) ABSTRACT

A two-dimensional code generation device includes an image acquisition unit acquiring, from a database, an image visually indicating a type of information to be provided by a two-dimensional code based on coding information, and a code generation unit generating the two-dimensional code based on the coding information. The coding information is information for generating the two-dimensional code. When the image acquisition unit acquires the image visually indicating the type of information to be provided by the two-dimensional code, the code generation unit includes the image acquired by the image acquisition unit in the two-dimensional code in a superimposed manner.

11 Claims, 5 Drawing Sheets

EXAMPLE OF SETUP DATA

| INTENDED PURPOSE | TYPE OF MAP | SCALE | PROCESSING METHOD |
|---|---|---|---|
| ROUTE GUIDANCE FOR VEHICLE | ROAD MAP | 1/100000 | HIGHLIGHT MAJOR ROADS AND MAIN RIVERS |
| | | | DELETE NARROW STREETS |
| ROUTE GUIDANCE FROM NEAREST STATION FOR WALKING | TOWN MAP | 1/5000 | HIGHLIGHT STATIONS |
| | | | HIGHLIGHT MAIN BUILDINGS |
| ROUTE GUIDANCE TO NEAREST STATION BY TRAIN | ROUTE MAP | 1/50000 | HIGHLIGHT NEAREST STATION |
| | | | HIGHLIGHT TRANSFER STATION |

TWO-DIMENSIONAL CODE GENERATION DEVICE AND TWO-DIMENSIONAL CODE GENERATION PROGRAM PRODUCT

CROSS REFERENCE TO RELATED APPLICATIONS

This application is a U.S. National Phase Application under 35 U.S.C. 371 of International Application No. PCT/JP2015/001274 filed on Mar. 9, 2015 and published in Japanese as WO 2015/146021 A1 on Oct. 1, 2015. This application is based on and claims the benefit of priority from Japanese Patent Application No. 2014-060073 filed on Mar. 24, 2014. The entire disclosures of all of the above applications are incorporated herein by reference.

TECHNICAL FIELD

The present disclosure relates to a two-dimensional code generation device and a two-dimensional code generation program product each of which generates a two-dimensional code.

BACKGROUND ART

In a QR code (registered trademark) which is one type of two-dimensional codes, generally, patterns of light and dark are displayed, and it is difficult for a user to visually grasp what information is included in the QR code by merely viewing the QR code. For that reason, for example, a caption is presented around the QR code, or a company name is superimposed on the QR code for display. For example, as disclosed in Patent Literature 1, in order to enhance an interest of a user, an image designed in advance is superimposed on the QR code.

However, in order to present the caption in addition to the QR code, a display space in addition to the space for displaying the QR code is required. For example, in magazines having limited paper size, display space may be restricted. When the image is superimposed on the QR code as described in Patent Literature 1, a creator of the QR code needs to understand what information is required to be provided by the QR code, and create an image indicating the information.

PRIOR ART LITERATURES

Patent Literature

Patent Literature 1: JP 2009-230729 A

SUMMARY OF INVENTION

In view of the foregoing difficulties, it is an object of the present disclosure to provide a two-dimensional code generation device and a two-dimensional code generation program each of which generates a two-dimensional code that visually indicates, to a user, type of information included in the two-dimensional code.

According to an aspect of the present disclosure, a two-dimensional code generation device includes an image acquisition unit and a code generation unit. The image acquisition unit acquires, from a database, an image visually indicating a type of information to be provided by a two-dimensional code based on coding information. The coding information is information for generating the two-dimensional code. The code generation unit generates the two-dimensional code based on the coding information. When the image acquisition unit acquires the image visually indicating the type of information to be provided by the two-dimensional code, the code generation unit includes the image acquired by the image acquisition unit in the two-dimensional code in a superimposed manner.

With the above two-dimensional code generation device, by merely viewing the two-dimensional code, a user can recognize the type of information to be provided by the two-dimensional code without scanning and reading the two-dimensional code. The image to be superimposed on the two-dimensional code is acquired based on the coding information. Thus, the image can be changed in response to the type of information to be provided by the two-dimensional code.

According to another aspect of the present disclosure, a two-dimensional code generation program product, which is stored in a non-transitory tangible computer readable storage medium, comprises instructions to be executed by a computer included in a controller of a two-dimensional code generation device. The instructions are for implementing acquiring, from a database, an image visually indicating a type of information to be provided by a two-dimensional code based on coding information, and generating the two-dimensional code by including the image that is acquired in a superimposed manner based on the coding information. Herein, the coding information is information for generating the two-dimensional code.

With the above two-dimensional code generation program product, by merely viewing the two-dimensional code, a user can recognize the type of information to be provided by the two-dimensional code without scanning and reading the two-dimensional code.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, an embodiment of the present disclosure will be described with reference to FIGS. 1 to 5.

Figure 1:
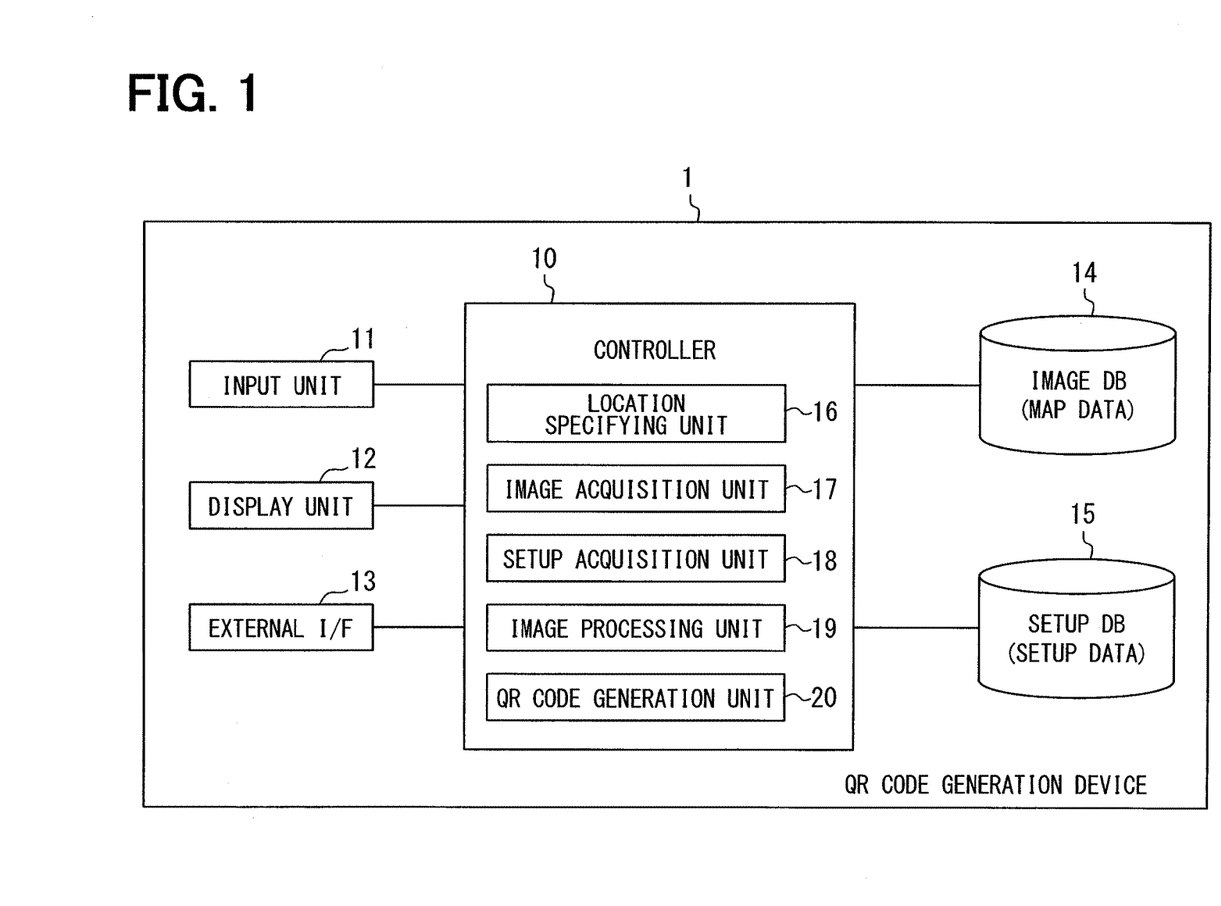
FIG. 1 is a diagram schematically illustrating an electric configuration of a QR code generation device according to an embodiment of the present disclosure.

FIG. 1 shows a QR code generation device 1 as an example of a two-dimensional code generation device according to the present disclosure. The QR code generation device 1 includes a controller 10, an input unit 11, a display unit 12, an external I/F 13, an image database 14, and a setup database 15. Hereinafter, the image database 14 is called "image DB 14", and the setup database 15 is called "setup DB 15". The QR code generation device 1 according to the present embodiment is configured by a personal computer, and the controller 10 is configured by a CPU of the personal computer, the input unit 11 is configured by a keyboard or a mouse of the personal computer, and the display unit 12 is configured by a display of the personal computer. In the present embodiment, the coding information for generating the QR code is input from the input unit 11, and the generated QR code is displayed on the display unit 12. The external I/F 13 is configured by, for example, a network interface or a memory card interface.

The controller 10 includes a location specifying unit 16, an image acquisition unit 17, a setup acquisition unit 18, an image processing unit 19, and a QR code generation unit 20. The location specifying unit 16 determines whether the location specifying information is included in the coding information, and specifies the location when the location specifying information is included in the coding information. Herein, the coding information is information used for generating the QR code. The image acquisition unit 17 acquires, from the image DB 14, an image that can visually present a type of information to be provided by the generated QR code. The image acquisition unit 17 acquires the image on the basis of the coding information. In the present embodiment, the image acquisition unit 17 acquires, from the image DB 14, a map image including a vicinity area of the location specified by the location specifying unit 16 and the specified location, and map data corresponding to the map image.

The setup acquisition unit 18 acquires setup information for processing the map image from setup data stored in the setup DB 15. The image processing unit 19 processes the map image to be superimposed on the QR code on the basis of the map data acquired by the image acquisition unit 17. The image processing unit 19 processes the map image on the basis of the setup record registered in the setup data according to the intended purpose for displaying the QR code. The code generation unit 20 generates the QR code on the basis of the coding information. When an image has been acquired by the image acquisition unit 17, the code generation unit 20 superimposes the acquired image on the QR code to generate the QR code. In the present embodiment, the location specifying unit 16, the image acquisition unit 17, the setup acquisition unit 18, the image processing unit 19, and the code generation unit 20 are realized in a software manner by a program executed by the controller 10.

The image DB 14 and the setup DB 15 are each configured by a storage medium such as a hard disk device. In FIG. 1, the image DB 14 and the setup DB 15 are illustrated, separately, but are physically configured by a single hard disk in the present embodiment.

In the present embodiment, the image DB 14 stores the map data. In the map data, data for displaying the map image including a vicinity area of a certain location such as roads, rivers, stations, lines, and various facilities is registered. In this case, when the location to be displayed is changed, the map image is also changed correspondingly. In other words, the map image acquired by the above-mentioned image acquisition unit 17 is also changed in response to the location change. The map image corresponds to an image that can visually indicate the type of information provided by the generated QR code. The map image can be displayed in color, and the QR code is displayed in color when the map image is superimposed on the QR code as will be described later. Alternatively, the map image and QR code may be displayed in monochrome.

In more detail, in the present embodiment, the information provided by the QR code is information related to the location. The information related to the location is provided as information for specifying a location of an event venue in an information magazine in which, for example, event information, leisure information, or the like is published. As a result, a route to a destination can be grasped to some extent by merely viewing the QR code. A user can be guided to the location read from the QR code, that is, the destination, for example, in cooperation with a navigation application. In other words, the user can visually grasp that the location information is provided by the QR code by merely viewing the QR code.

In this situation, when the map image is superimposed on the QR code as it is, there is a risk that the map becomes difficult to be recognized by a user. For that reason, the QR code generation device 1 processes the map image by the above-mentioned image processing unit 19 in order that the map is easily recognized by a user, that is, the location indicated by the map is easily grasped by a user. In this situation, various setups for processing the map image are registered in the setup DB 15. In the present embodiment, the following settings are defined in the setup data.

(i) Setup for highlighting specific data included in the map data: Setup for highlighting specific data such as major roads, railways, rivers, and boundaries of administrative divisions when displaying the map image on the basis of the map data. For example, the major roads can be thickly displayed, a display color of the major roads can be changed, or an outline of the major roads can be clarified to highlight the roads. The determination of major roads may be performed according to determination criteria such as whether the road has a predetermined road width or whether the road is a national road on the basis of the map data. In the present embodiment, determination criteria for determining the major road are also registered in the setup data.

(ii) Setup for obscuring specific data included in the map data: Setup for displaying characters of place names, etc., narrow streets, unnecessary facilities, or the like obscurely, in other words, ambiguously, when displaying the map image on the basis of the map data. For example, the characters or the narrow streets can be displayed ambiguously by deleting the characters or the narrow streets, changing a display color similar to a background color, reducing a display size, or the like.

(iii) Setup for displaying a mark on the map image: Setup for placing a symbol or the like as a target on the map image when displaying the map image on the basis of the map data, to easily recognize noteworthy information. For example, a destination mark may be displayed at a location of the destination on the map image so that the user can grasp the location of the destination.

(iv) Setup for simplifying specific data included in the map data: Setup for simplifying and displaying complex terrains or the appearance of facilities when displaying the map image on the basis of the map data. For example, the complex terrains such as a coastline or a hilly area can be simplified so that the user can easily grasp the shape of the complex terrain.

(v) Setup for changing a scale of the map image to be displayed: Setup for changing an area to be displayed when displaying the map image on the basis of the map data. For example, scale of 1/5000 may be set when displaying the map image of an urban area, and scale of 1/100000 may be set when displaying the map image including highways.

(vi) Type of the map to be displayed: Setup for the map data that is a basis of the map image to be displayed such as a road map, a route map, or a town map.

Figure 2:
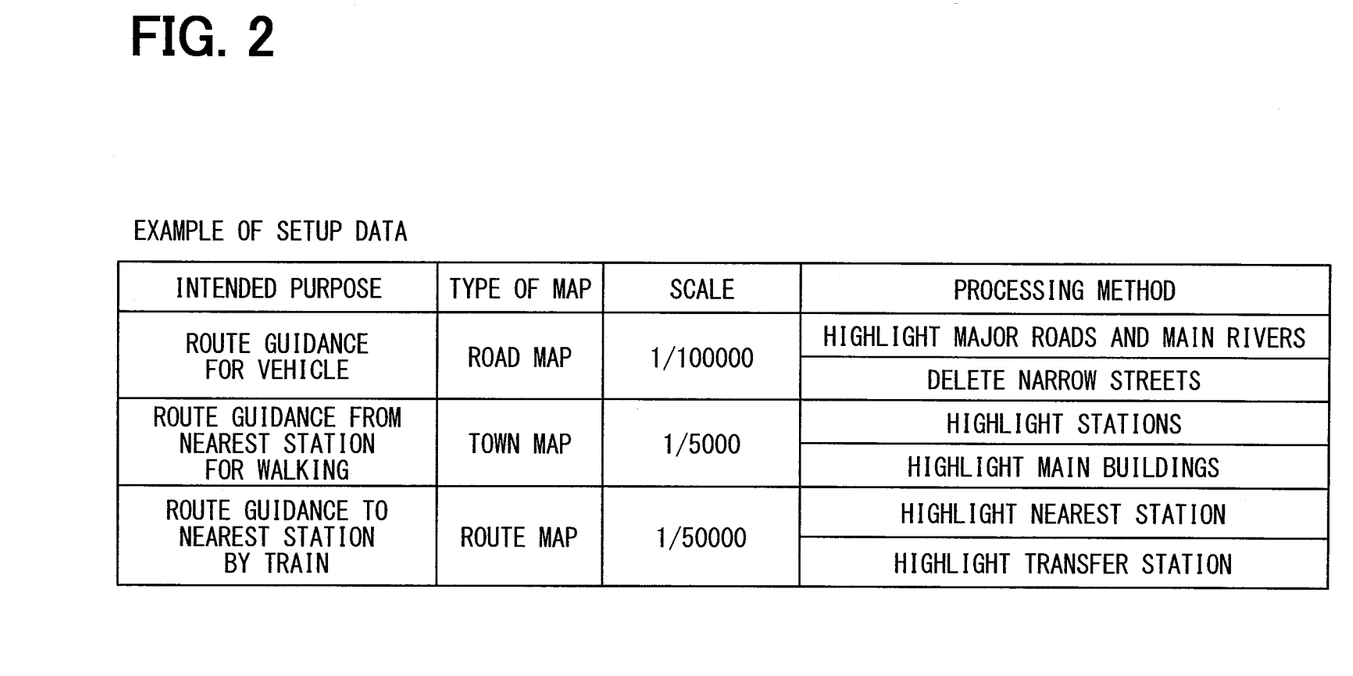
FIG. 2 is a diagram illustrating an example of setup data registered in a setup DB.

As illustrated in FIG. 2, various records of the setup are registered according to an intended purpose for displaying the QR code included in the coding information. For example, when the intended purpose of the QR code is "route guidance for vehicle", the setup record in which the type of the map is defined as "road map", the scale is defined as "1/100000", and the processing method is defined as "highlighting major roads and main rivers" and "delete narrow streets" is registered. When the intended purpose of the QR code is "route guidance from nearest station for walking", the setup record in which the type of the map is defined as "town map", the scale is defined as "1/5000", and the processing method is defined as "highlight stations" and "highlight main buildings" is registered. When the intended purpose of the QR code is "route guidance to nearest station by train", the setup record in which the type of the map is defined as "route map", the scale is defined as "1/50000", and the processing method is defined as "highlight nearest station" and "highlight transfer station" is registered. Those setup data records are shown as examples, and it is needless to say that other setup records may be registered.

The QR code generation device 1 having above-described configuration generates the QR code which visually indicates, to the user, the type of information to be provided as follows. Since a technique for generating the QR code and a coloring technique are well known, a description of those techniques will be omitted. The following QR code generating process is performed by the location specifying unit 16, the image acquisition unit 17, the setup acquisition unit 18, the image processing unit 19, and the code generation unit 20. For simplification of the description, the QR code generation device 1 will be described as a subject of the following process.

Figure 3:
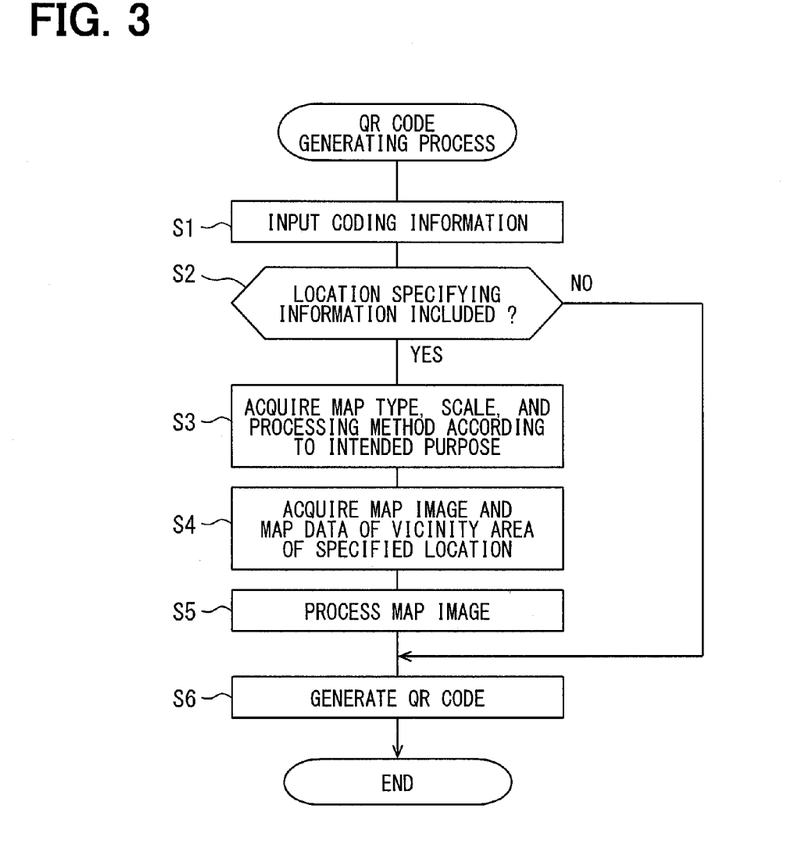
FIG. 3 is a flowchart illustrating a flow of a QR coding process.
Figure 4:
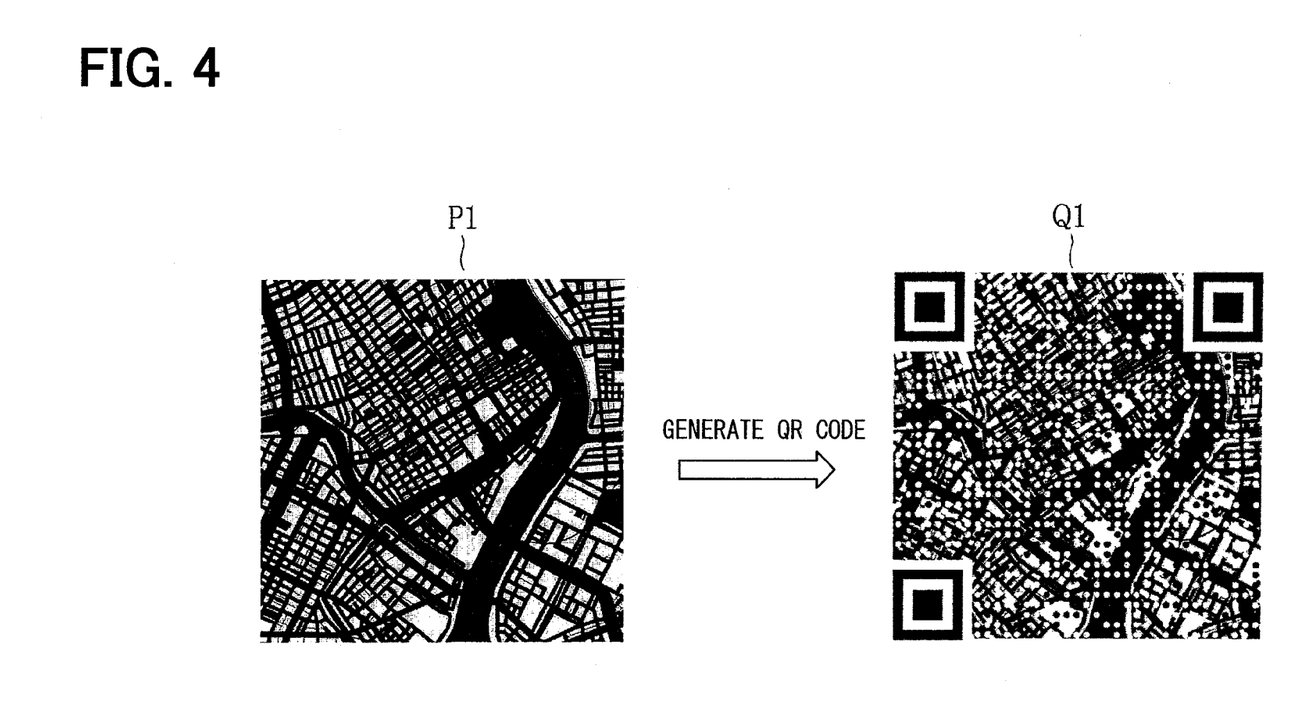
FIG. 4 is a diagram schematically illustrating an example in which an unprocessed map image is subjected to QR coding.

As shown in FIG. 3, in the QR code generating process, upon receiving the coding information (S1), the QR code generation device 1 determines whether the location specifying information is included in the coding information (S2). The location specifying information is information included in the coding information, and is also information that indicates a location. The location specifying information is information based on which a location can be directly or indirectly specified, such as latitude and longitude, address, zip code, telephone number, or area mesh code (JISX0410). This determination is performed by the location specifying unit 16. The process executed in step S2 corresponds to a location specifying process.

When the location specifying unit 16 determines that the location specifying information is not included in the coding information (S1: NO), the QR code generation device 1 generates the QR code on the basis of the coding information (S6). The process executed in step S6 corresponds to a QR code generating process. In this case, the generated QR code is displayed in a normal pattern of light and dark. This makes it difficult for a user to grasp the type of provided information by merely viewing the QR code.

On the contrary, when the location specifying unit 16 determines that the location specifying information is included in the coding information (S1: YES), the QR code generation device 1 extracts intended purpose from the coding information, and acquires the setup information including the map type, the map scale, and the processing method of the map corresponding to the intended purpose (S3). The process executed in step S3 is a setup acquisition process for acquiring the setup information from the setup data stored in the setup DB 15. The acquisition of the setup information is performed by the setup acquisition unit 18. Subsequently, the QR code generation device 1 acquires a map image in the vicinity area of the specified location, and map data for displaying the map image from the image DB 14 (S4). The process executed in step S4 corresponds to an image acquisition process. The acquisition of the map image is performed by the image acquisition unit 17.

The acquired map image is an image indicating a vicinity area of the specified location. The acquired map image includes the specified location and roads, facilities, and so on located around the specified location. Specifically, various kinds of information are included as indicated by a map image P1 illustrated in FIG. 4. When the map image is directly superimposed on the QR code, the pattern of light and dark is directly superimposed on the map, and it is conceivable that the map image is difficult to view as shown in a QR code Q1.

Figure 5:
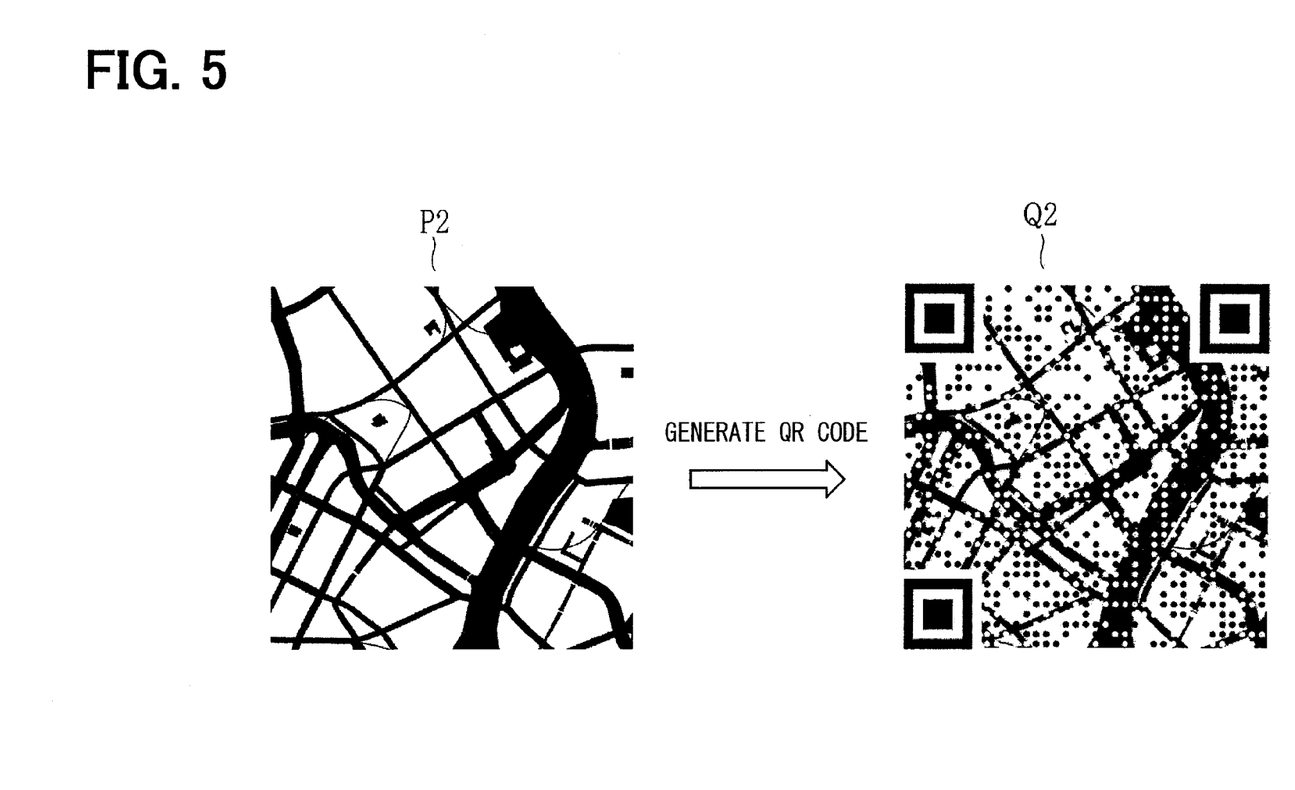
FIG. 5 is a diagram schematically illustrating an example in which the processed map image is subjected to the QR coding.

Under the above-described circumstances, the QR code generation device 1 processes the map image (S5) on the basis of the intended purpose and the setup information acquired in step S3. Specifically, when the intended purpose is, for example, "route guidance for vehicle" described above, the QR code generation device 1 processes the map image under the processing method of "highlight major roads and main rivers" and "delete narrow streets". The major roads, the main rivers, or the narrow streets can be determined by the map data. As a result, the major roads are highlighted in the map image P1 illustrated in FIG. 4 and the narrow streets are deleted from the map image P1 illustrated in FIG. 4. As a result, a map image P2 illustrated in FIG. 5 is acquired. The process executed in step S5 is map processing process for processing the map image on the basis of the setup information acquired in the setup acquisition unit 18. The processing of the map image is performed by the image processing unit 19.

The QR code generation device 1 generates the QR code with the use of the processed map image (S6). As a result, as the QR code Q2 shown in FIG. 5, even when the map is superimposed on the QR code pattern, the user can know the QR code image provides map information. Further, the user can visually grasp the target location on the map image based on the QR code.

The present embodiment described above can obtain the following advantages.

The QR code generation device 1 acquires, from the image DB 14, the image that can visually indicate the type of information to be provided by the generated QR code on the basis of the coding information. Herein, the coding information is information for generating the QR code. Then, the QR code generation device generates the QR code on which the acquired image is to be superimposed. As a result, by merely viewing the QR code, the user can grasp the type of provided information without scanning the QR code. In this situation, since the image is acquired on the basis of the coding information, the image can be changed according to information to be provided.

The QR code generation device 1 determines whether the location specifying information is included in the coding information, and specifies the location when the location specifying information is included in the coding information. Then, the QR code generation device 1 acquires the map image including the specified location and the vicinity area of the specified location to generate the QR code. Then, the acquired map image is superimposed on the QR code. As a result, the QR code generation device 1 can visually provide multiple pieces of information by a single QR code. That is, the QR code can visually indicate the information provided by the QR code is a location specifying information, and can visually indicate the location on the map.

In addition, a display space for presenting a caption indicating that the location specifying information is included in the QR code becomes unnecessary, and when a paper surface is limited as with magazines, the display space may not be restricted. Further, a creator of the QR code is not required to understand what information is provided by the QR code, and there is no need to create an image corresponding to the QR code. Thus, the QR code generation work can be performed in easy and simplified way.

The user can visually grasp that the QR code is indicative of the location specifying information. Thus, the user can predict that a route guidance by, for example, a navigation application can be performed by scanning the QR code. Further, a service having an added value exceeding a simple provision of information can be provided by using this kind of QR code.

The QR code generation device 1 acquires the map data corresponding to the map image including the vicinity area of the specified position, and processes the map image on the basis of the acquired map data. Because the map data includes information on roads and rivers, a display mode of the roads and the rivers can be changed on the basis of the map data. For example, the map data is processed to highlight the major roads so that the map is easily recognized. Therefore, by merely viewing the QR code, the user can understand the location of destination based on the map data.

The QR code generation device 1 acquires, from the setup DB 15, the setup data in which the setup information for processing the map image is registered. Then, the QR code generation device 1 processes the map image on the basis of the acquired setup information. As a result, the QR code generation device 1 can process the map image according to the main intended purpose. Because the setup information of the processing method is registered in advance, the amount of work required for the creator can be reduced, and convenience of QR code generating work can be improved.

In the present embodiment, the setup for highlighting the specific data included in the map data, the setup for obscuring the specific data included in the map data, the setup for displaying a mark on the map image, the setup for simplifying the specific data included in the map data, the setup for changing a scale of the map image to be displayed, and the setup of the type of the map to be displayed, are registered in the setup data in advance. Thus, what process is to be performed when generating the QR code can be easily determined based on the registered setup information.

The above respective setup information are registered according to the intended purpose for displaying the QR code. The QR code generation device 1 processes the map image on the basis of the setup information corresponding to the intended purpose for displaying the QR code. As a result, the process corresponding to the intended purpose can be performed, for example, such that the map scale is increased and the major roads are highlighted when the map data is for notification to a visitor by a vehicle from a distance, and the scale is decreased and the railway is highlighted when the map data is for guidance from a station to a store. Therefore, the amount of work for the creator of the QR code can be reduced, and the convenience of QR code generation work can be improved.

The advantages of the above-mentioned QR code generation device 1 can be obtained by the QR code generation program including the image acquisition process for acquiring the image that can visually present the type of information provided by the generated QR code from the database 14 on the basis of the coding information for generating the QR code, and the QR code generating process for generating the QR code on which the acquired image is superimposed when the image is acquired by the image acquisition process while generating the QR code on the basis of the coding information. In other words, the above-mentioned advantages can be obtained by the QR code generation program such that the QR code that can visually grasp the type of the provided information can be generated. The QR code generation program can be provided as a program product stored in a non-transitory tangible computer readable storage medium.

In this case, based on the generated QR code, the user can visually grasp the information provided by the QR code represents the location, and can grasp the location by viewing the QR code by executing the location specifying process for specifying the location on the basis of the location specifying information, and by acquiring the map image including the vicinity area of the specified location in the image acquisition process.

It is noted that a flowchart or the processing of the flowchart in the present disclosure includes units (also referred to as steps), each of which is represented, for instance, as S1. Further, each unit can be divided into several sub-units while several units can be combined into a single unit. Furthermore, each of thus configured units can be also referred to as a circuit, device, module, or means.

Each or any combination of units explained in the above can be achieved as (i) a software unit in combination with a hardware unit (e.g., computer) or (ii) a hardware unit, including or not including a function of a related apparatus; furthermore, the hardware unit (e.g., integrated circuit, hard-wired logic circuit) may be constructed inside of a microcomputer.

Other Embodiments

The present disclosure is not limited to the exemplifications of the above embodiment, but can be modified and expanded without departing from the scope of the exemplifications.

In the foregoing embodiment, an example in which the map image is superimposed on the QR code is illustrated. The superimposed image is not limited to the map image. In other words, the type of information provided by the QR code may be information other than the information related to the location. For example, an image that can visually present a restaurant or a hotel may be superimposed on the QR code.

In the foregoing embodiment, the QR code generation device 1 is configured by one personal computer. Alternatively, the location specifying unit 16, the image acquisition unit 17, the setup acquisition unit 18, the image processing unit 19, and the code generation unit 20 may be configured by multiple personal computers separated from one another. The input unit and the display unit may be configured such that the coding information is input to the QR code generation device 1 by a personal computer or a smartphone of the creator. Alternatively, in a QR code generation system, the image DB 14 and the setup DB 15 may be installed in a server on a network, the coding information may be transmitted to the server side from the QR code generation device 1 side, and an image selected on the server side may be acquired. The image DB 14 and the setup DB 15 may be disposed in different servers.

In the above embodiment, the device and the program product for generating a QR code (ISO/IEC18004) that is one type of the two-dimensional code have been described.

Alternatively, the present disclosure may be applied to a device and a program product for generating other two-dimensional codes.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A two-dimensional code generation device comprising:
    an image acquisition unit acquiring, from a database, an image visually indicating a type of information to be provided by a two-dimensional code, the image varying based on coding information, the coding information being information for generating the two-dimensional code; and
    a code generation unit generating the two-dimensional code based on the coding information, wherein,
    when the image acquisition unit acquires the image visually indicating the type of information to be provided by the two-dimensional code, the code generation unit includes the image acquired by the image acquisition unit in the two-dimensional code in a superimposed and size reducing manner.

2. The two-dimensional code generation device according to claim 1, further comprising:
    a location specifying unit determining whether the coding information includes location specifying information and specifying a location indicated by the location specifying information when determining that the coding information includes the location specifying information, wherein
    the location specifying information is information used for specifying the location,
    the image acquisition unit acquires, from the database, a map image including a vicinity area of the location specified by the location specifying unit, and
    the code generation unit generates the two-dimensional code to include the map image in the superimposed manner.

3. The two-dimensional code generation device according to claim 2, wherein
    the database stores map data for generating the map image,
    the image acquisition unit acquires, from the database, the map data corresponding to the map image including the vicinity area of the location specified by the location specifying unit, and
    the two-dimensional code generation device further comprises an image processing unit that processes the map image to be included in the two-dimensional code in the superimposed manner based on the map data acquired by the image acquisition unit.

4. The two-dimensional code generation device according to claim 3, wherein
    the database stores setup data in which setup information for processing the map image is registered,
    the two-dimensional code generation device further comprises a setup acquisition unit, and the setup acquisition unit acquires the setup information for processing the map image from the setup data stored in the database, and
    the image processing unit processes the map image based on the setup information acquired by the setup acquisition unit.

5. The two-dimensional code generation device according to claim 4, wherein
    the setup information registered in the setup data includes at least one of the following setup items (i) to (vi):
    (i) setup for highlighting specific data included in the map data;
    (ii) setup for obscuring specific data included in the map data;
    (iii) setup for displaying a mark on the map image;
    (iv) setup for simplifying specific data included in the map data;
    (v) setup for changing a display scale of the map image; and
    (vi) a type of the map image to be displayed.

6. The two-dimensional code generation device according to claim 5, wherein
    the coding information includes information related to an intended purpose of the information to be provided by the two-dimensional code,
    a record of setup information corresponding to the intended purpose of the information to be provided by the two-dimensional code is registered in the setup data, and
    the image processing unit processes the map image based on the record of setup information registered in the setup data according to the intended purpose of the two-dimensional code.

7. The two-dimensional code generation device according to claim 1, wherein
    the two-dimensional code is a QR code (registered trademark).

8. A two-dimensional code generation program product stored in a non-transitory tangible computer readable storage medium, the program product comprising instructions to be executed by a computer included in a controller of a two-dimensional code generation device, the instructions for implementing:
    acquiring, from a database, an image visually indicating a type of information to be provided by a two-dimensional code, the image varying based on coding information, the coding information being information for generating the two-dimensional code; and
    generating the two-dimensional code by including the image that is acquired in a superimposed and size reducing manner based on the coding information.

9. The two-dimensional code generation program product according to claim 8, wherein
    the coding information includes location specifying information used for specifying a location, and
    the program product further comprises instructions to be executed by the computer for implementing:
    specifying the location based on the location specifying information; and
    acquiring, from the database, a map image including a vicinity area of the location specified based on the location specifying information.

10. The two-dimensional code generation program product according to claim 8, wherein
    the two-dimensional code is a QR code (registered trademark).

11. A two-dimensional code generation device comprising:
    an image acquisition unit acquiring, from a database, an image visually indicating a type of information to be provided by a two-dimensional code, the image varying based on coding information, the coding information being information for generating the two-dimensional code; and a code generation unit generating the two-dimensional code based on the coding information, wherein when the image acquisition unit acquires the image visually indicating the type of information to be provided by the two-dimensional code and a dimensional size of the acquired image is smaller than a predetermined display space for the two-dimensional code, the code generation unit includes the image acquired by the image acquisition unit in the two-dimensional code in a superimposed manner without reducing the dimensional size of the acquired image.

* * * * *